Patented May 1, 1928.

1,667,872

UNITED STATES PATENT OFFICE.

CONRAD F. SCHRIMPE, OF PERTH AMBOY, NEW JERSEY, ASSIGNOR TO BAKELITE CORPORATION, OF NEW YORK, N. Y., A CORPORATION OF DELAWARE.

BUTYL ALDEHYDE-PHENOL RESINS AND PROCESS OF MAKING THE SAME.

No Drawing. Application filed September 27, 1922, Serial No. 590,964. Renewed September 26, 1927.

This invention relates to phenolic condensation products and comprises a novel product of this type prepared by the reaction of phenol or a phenolic body (including cresols or mixtures thereof) with butyl aldehyde.

I have discovered that fusible resins having many desirable characteristics may be readily prepared by reacting with butyl aldehyde, or aldehyde mixtures containing material proportions thereof, upon phenolic bodies, such for example as phenol, cresol or the like. The reaction proceeds best under acid conditions or in presence of acid condensing agents, and is preferably carried out as follows, it being understood that the example is illustrative only.

100 parts by weight of phenol are mixed with about 65 parts of butyl aldehyde and with a small proportion, say 1 to 3 per cent, of hydrochloric acid. The mixing is best done in a flask or other reactor provided with a reflux condenser. The reaction, which involves a splitting off of water, starts spontaneously, and is permitted to proceed to completion or approximate completion, the temperature being controlled if required by appropriate cooling. After the initial reaction, which is strongly exothermic, has subsided, heat is applied and the reaction continued for about four hours, or until the resinous product appears as a heavy viscous mass and the characteristic odor of butyl aldehyde is no longer noted. The product may then be further heated to about 180° C. to expel residual water derived from the reaction, free butyl aldehyde and free phenol. Upon cooling the product appears as a transparent brittle resin, which when the proportions of reagents are substantially as above specified is of the so-called "non-reactive" type in that it is not readily converted by simple heating into an infusible modification. The resin resembles in its general properties and characteristics the known resins of the fusible and soluble type prepared from phenols by reaction thereon with formaldehyde and acetaldehyde; and in common with these has been found to possess the property of being convertible, by reaction with such methylene-containing bodies as formaldehyde, hexamethylenetetramine, etc. (hereinafter referred to as bodies containing a mobile methylene group), into a hard, infusible resinous body, which in its completely transformed state is but little attacked by known solvents.

The fusible resin described above may be used in any of the ways now familiar to those skilled in this art. For example, it may be utilized in conjunction with suitable organic solvents such as alcohols, acetone, etc. for the preparation of varnishes, lacquers or cements, which will be of the reactive type if hexamethylenetetramine or other body containing a mobile methylene group be incorporated therewith. Similarly it may be employed in conjunction with such methylene-containing body and appropriate fillers, as wood-flour, for the preparation of molding mixtures, which are of the reactive type, and under hot-pressing for a sufficient time and at a sufficient temperature as now practiced in this art will yield extremely hard and inert products in any desired form. In the case of hexamethylenetetramine, from five to ten per cent by weight thereof may be incorporated with the resin, according to the degree of hardness desired in the final product.

Reaction products of varying characteristics, with respect to fusibility and solubility may be prepared by the use in the initial preparation of the resin, of varying proportions of butyl aldehyde and phenolic body, the product tending to lesser fusibility, or less perfect fusibility, as the proportion of the aldehyde is increased. I prefer however, for most purposes, to prepare a distinctively fusible and non-reactive resin in the first instance, and to effect its transformation in a later operating stage by means of a methylene-containing hardening or converting agent, as above described.

I claim:

1. The hereindescribed resinous condensation product of phenol and butyl aldehyde.

2. The hereindescribed fusible, non-reactive resinous condensation product of phenol and butyl aldehyde.

3. The method of preparing a fusible condensation product, comprising reacting with butyl aldehyde upon a phenolic body in presence of an acid condensing agent.

4. A resinous composition prepared from butyl aldehyde and a phenolic body.

5. The process of making a resin which comprises heating phenol and butyl aldehyde with an acid catalyst.

6. A resinous substance comprising a butyl aldehyde, phenol resin incorporated with hexamethylenetetramine and filling material.

In testimony whereof, I affix my signature.

CONRAD F. SCHRIMPE.